United States Patent [19]

Vorum

[11] Patent Number: 4,760,819
[45] Date of Patent: Aug. 2, 1988

[54] SHORT PIPE MANIFOLD FOR FOUR-STROKE ENGINES

[76] Inventor: Peter C. Vorum, 6254 E. State, Rte. 40, Lot 56, Tipp City, Ohio 45371

[21] Appl. No.: 74,117

[22] Filed: Jul. 16, 1987

[51] Int. Cl.[4] .............................................. F02B 75/18
[52] U.S. Cl. ........................... 123/52 MB; 123/52 MC
[58] Field of Search .......... 123/52 M, 52 MB, 52 MC

[56] References Cited

U.S. PATENT DOCUMENTS

| | | |
|---|---|---|
| 1,133,528 | 3/1915 | Bennett . |
| 1,802,544 | 4/1931 | Vincent . |
| 1,895,538 | 1/1933 | Büchi . |
| 1,977,200 | 10/1934 | Osterberg . |
| 1,982,625 | 12/1934 | Barker . |
| 2,088,983 | 8/1937 | Swennes . |
| 2,137,802 | 11/1938 | Ginn . |
| 2,281,585 | 5/1942 | Kadenacy . |
| 2,337,996 | 12/1943 | Hersey et al. . |
| 2,382,244 | 8/1945 | Lundquist et al. . |
| 2,390,913 | 12/1945 | Barrett . |
| 2,581,668 | 1/1952 | Kadenacy . |
| 2,740,389 | 4/1956 | Reyl . |
| 2,766,743 | 10/1956 | Platner et al. . |
| 2,791,205 | 5/1957 | Platner et al. . |
| 2,801,620 | 8/1957 | Goodridge . |
| 2,845,911 | 8/1958 | Gill . |
| 2,857,893 | 10/1958 | Lobdell . |
| 3,015,322 | 1/1962 | Rohm . |
| 3,111,937 | 11/1963 | Johnson et al. . |
| 3,146,764 | 9/1964 | Elsbett . |
| 3,298,332 | 1/1967 | Elsbett ............... 123/52 M |
| 3,396,532 | 8/1968 | Munk .................... 60/13 |
| 3,796,048 | 3/1974 | Annus et al. ........... 60/598 |
| 3,845,746 | 11/1974 | Elsbett . |
| 3,983,853 | 10/1976 | Gospodar et al. ....... 123/52 M |
| 4,013,049 | 3/1977 | Dilgard et al. ......... 123/52 M |
| 4,064,696 | 12/1977 | Cser ...................... 60/598 |
| 4,111,163 | 9/1978 | Ederer et al. .......... 123/52 M |
| 4,153,015 | 5/1979 | Hampton .............. 123/52 M |
| 4,179,892 | 12/1979 | Heydrich ............... 60/605 |
| 4,300,488 | 11/1981 | Cser ..................... 123/52 M |
| 4,353,211 | 10/1982 | Cser et al. ............. 60/605 |
| 4,461,248 | 7/1984 | McFarland, Jr. ....... 123/52 M |
| 4,481,922 | 11/1984 | Sugiura ................. 123/306 |
| 4,523,560 | 6/1985 | Motosugi et al. ....... 123/308 |
| 4,538,556 | 9/1985 | Takeda ................. 123/52 MB |
| 4,549,506 | 10/1985 | Rush, II et al. ........ 123/52 MB |
| 4,565,166 | 1/1986 | Takeda ................. 123/52 M |
| 4,574,748 | 3/1986 | Inoue et al. ........... 123/52 MB |
| 4,608,948 | 9/1986 | Inoue et al. ........... 123/52 M |
| 4,628,873 | 12/1986 | Bitter .................. 123/52 M |

OTHER PUBLICATIONS

P. C. Vorum, "Short Pipe Manifold Design for Four-Stroke Engines: Part 11", ASME Paper 80-DGP-6, 5/1971.

(List continued on next page.)

Primary Examiner—Charles J. Myhre
Assistant Examiner—David A. Okonsky
Attorney, Agent, or Firm—Frederick L. Sinder; Donald J. Singer

[57] ABSTRACT

A series of four-stroke engine manifolds for providing improved power and torque over a wide range of engine speeds are described. A two-mode two degree-of-freedom resonator model for manifolds is described that predicts two individual torque peaks. The model is shown to be valid only when two described dimensionless parameters, computer from the dimensions of the manifold and the engine to which it is attached, have minimum values. If the two minimum values are not maintained, the correct resonator model collapses to a one degree-of-freedom system which provides only one, generally lower, torque peak. By requiring minimum values for the two parameters, the resulting manifolds provide the desired improved power and torque. The manifolds comprises two, three or four primary runners each connected at first ends to an engine cylinder and together at second ends to a secondary runner. A primary volume is defined as the volume of an engine cylinder with its piston at midstroke. A secondary volume is defined as the total volume of all primary runners, other than a primary runner attached to a first cylinder, and all cylinder intake ports, other than the intake port for the first cylinder. The manifold dimensions are limited so that the runner coefficient, the ratio of the length-to-area ratio of the secondary runner divided by the length-to-area ratio of any primary runner, is at least 0.15; and, so that the volume coefficient, the ratio of the secondary volume divided by the primary volume is at least 2.0.

12 Claims, 5 Drawing Sheets

OTHER PUBLICATIONS

P. C. Vorum, "Short Pipe Manifold Design for Four-Stroke Engines", ASME Paper 76-WA/DGP-4, 7/1976.
M. P. Thompson and H. W. Engleman, "The Two Types of Resonance in Intake Tuning", ASME Paper 69-DGP-11, 1/1969.
P. C. Vorum, "Short Pipe Tuning of the Exhaust Manifold of a Four-Stroke Engine", Masters Thesis, The Ohio State University, 1/1975.

SHORT PIPE MANIFOLD FOR FOUR-STROKE ENGINES

RIGHTS OF THE GOVERNMENT

The invention described herein may be manufactured and used by or for the Government of the United States for all governmental purposes without the payment of any royalty.

BACKGROUND OF THE INVENTION

The present invention relates generally to intake and exhaust manifolds for internal combustion engines, and more specifically to manifolds providing improved power and torque over a wide range of engine speeds for multi-cylinder four-stroke internal combustion engines.

Intake manifolds of carbureted internal combustion engines transport combustion air and fuel, mixed in the carburetor, to the engine cylinders. Intake manifolds of fuel injected spark ignition and compression ignition (diesel) engines, which separately inject raw fuel close to or into the cylinders, transport combustion air only. Exhaust manifolds transport combustion products, called exhaust, from the cylinders to the atmosphere. A carbureted engine typically has its carburetor mounted over a plenum of the intake manifold. A fuel injected or diesel engine typically has an air intake mounted over a plenum of the intake manifold. Air, or an air/fuel mixture, enters the plenum and travels to the cylinders through ducts called pipes or runners. The runners exit at inlet ports at each cylinder. Inlet valves at each inlet port control the passage of air through the ports into the cylinders. Outlet ports, controlled by outlet valves, control the passage of exhaust to exhaust runners which lead to the atmosphere.

Intake air is drawn into each cylinder during an intake cycle (or stroke) primarily by the vacuum created by downward movement of the piston inside the cylinder. Exhaust is forced out of each cylinder during an exhaust cycle primarily by the pressure created by upward movement of the piston. The prior art has made substantial efforts toward increasing the amount and velocity of air, or air/fuel mixture, drawn into the cylinders during the intake cycle and increasing the amount of exhaust forced out of the cylinders during the exhaust cycle. Primarily, these efforts comprise supercharging the air, or air/fuel mixture, into the cylinders, and scavenging the exhaust out of the cylinders. Mechanical superchargers, driven off the camshaft or crankshaft, and turbochargers, driven by the force of exhaust gases, are used to force more air, or mixture, into the cylinders. Unfortunately, these mechanical devices add complexity and cost. Further, mechanical superchargers are inefficient at low engine speeds and turbochargers restrict the flow of exhaust. The prior art has sought to obtain the advantages of these mechanical add-on devices without their disadvantages by attempting to make "tuned" manifolds which utilize the pressure waves in the intake air and in the exhaust created by rapid piston movement to augment intake and exhaust by tuning the waves to be substantially in phase with the desired directions of movement of combustion air and exhaust.

Manifold tuning has been accomplished primarily by two methods, experimentation and mathematical modeling of manifold systems. In many cases a combination of the two methods is used. A conceptual model of the physical flows in a manifold is made, followed by experimentation on manifolds made in accordance with the teachings of the model.

An early model of intake manifold systems developed at MIT treats the runner to each cylinder as a quarter wave organ pipe resonator with internal acoustic vibrations. This model assumes steady state flow through the runner pipe. The acoustic model assumes a continuous wave in the runner that is initiated by intake valve closure and that the quarter wave organ pipe resonance frequency may be matched to the engine speed to improve performance. Experiments do not fully support the accuracy or usefulness of this model. One problem with the model is that it includes the invalid assumption that the intake valve is only open for 180 degrees of engine crank travel. A problem with using the model is that it requires a different manifold length correction factor for each engine speed for which one wishes to design. Another problem with using the model is that, used properly, it predicts useful runner lengths of approximately 200 inches for a typical automobile engine. Experiments using more practical runner lengths are measuring transients and other factors. Unfortunately, this model has achieved a popularity in use much greater than even its original developers and experimentors deemed supportable.

A later model of manifold systems tested at the University of Wisconsin placed a Helmholtz resonator at the carburetor inlet. Experimental manifolds attempting to take advantage of the teachings of this model have not achieved significant improvements in performance.

More complicated models have been proposed which require solving complicated differential equations, now made easier through the use of finite difference method and method of characteristics solutions on computers. These models generally assume a continuous wave model similar to the MIT model, but ignore the cylinder except as a source of a boundary condition which initiates a wave and produces a heat release due to the combustion in the cylinder. Attempts at experimental verification of these models in multi-cylinder engines require very time consuming model preparation and the solutions appear to be unique to each engine so that lessons learned from one engine may not be transfered to another. This model appears to give accurate estimates of engine power, fuel consumption and efficiency, but with the cumbersome long runners of the MIT model. Its usefulness for developing new manifolds for new engines is limited.

A recent flow model used in developing turbocharged exhaust systems assumes Fanno line (friction) flow as the basis for maximizing mass flow through the engine. Runner length is kept short to reduce losses and the runner is insulated between the exhaust valve and the turbine entrance. This model is not a resonance model and assumes that all waves are in phase.

The failure of the prior art single mode models led researchers at the University of Wisconsin, and later at The Ohio State University, to develop a two-mode model of manifold systems. This model is broken into two distinct parts or modes—as a Helmholtz resonator when the port valve is open, and as an organ pipe when the valve is closed. For the Helmholtz resonator model the cylinder is treated as the cavity and the runner as the neck. Experiments on single cylinder engines show the validity of this model. In a "short" (substantially less than one wave length) pipe manifold the Helmholtz model dominates and is used to time the pressure excursion that ram supercharges the intake or scavenges the exhaust.

Extension of the two-mode model from single to multi-cylinder engines changes the single degree-of-freedom equation of the single cylinder system into a two degree-of-freedom equation in multi-cylinder systems. The characteristic equation of the multi-cylinder system is developed by analogy to equations for parallel electrical L-C circuits, the electrical analog to a Helmholtz resonator. This produces a quadratic equation, the solution to which reveals two engine speeds at which performance will peak for both the intake and the exhaust manifold. Experiments show that the extended two-mode model usefully predicts manifold system performance in multi-cylinder engines.

A more complete description and analysis of the various models may be found in ASME (American Society of Mechanical Engineers) Paper No. 76-WA/DGP-4, "Short Pipe Manifold Design for Four-Stroke Engines," 1976; and, in ASME Paper No. 80-DGP-6, "Short Pipe Manifold Design for Four-Stroke Engines: Part II," 1980, both by the inventor, which are incorporated herein by reference. A specific discussion of the two-mode model may be found in ASME Paper No. 69-DGP-11, "The Two Types of Resonance in Intake Tuning," 1969, by Thompson and Engleman, also incorporated by reference. ASME Paper No. 76-WA/DGP-4 includes examples of using the equations developed for the two-mode two degree-of-freedom multi-cylinder model to design manifolds to produce the two separate torque peaks at preselected engine speeds.

Despite the valuable use in manifold design that may be made of the prior art teachings, the solutions are not simple to implement and require a high level of sophistication on the part of the manifold designer.

It is, therefore, a principal object of the present invention to provide a tuned manifold system that is simple to implement and provides a convenient starting point for designers wishing to further refine manifold tuning through experimentation.

It is another object of the present invention to provide a simple means for successfully implementing the advantages of the two-mode two degree-of-freedom model.

It is a further object of the present invention to provide a selection of manifold elements that may be combined to achieve specific desired engine characteristics.

A feature of the present invention is that the broadened power curve provided by two torque peaks allows the use of a transmission with fewer gears and thereby less complexity and reduced maintenance requirements.

An additional feature of the present invention is that it provides a free breathing system that adds power and performance at all engine speeds.

Yet another feature of the present invention is that its tuning is not affected by the additional use of superchargers or turbochargers.

An advantage of the present invention is that it increases power, improves emissions characteristics and reduces fuel consumption.

An additional and particular advantage of the present invention is that it lowers peak combustion temperature and thereby reduces thermal damage to engine components.

A further advantage of the present invention is that it reduces knock sensitivity.

Yet another advantage of the present invention is that it provides the advantages of ram supercharging without the complexity of mechanical add-on devices or of dual manifold systems having mechanical valves that switch from a low engine speed manifold system to a high engine speed manifold system.

SUMMARY OF THE INVENTION

The present invention provides a manifold offering improved power and torque over a wide range of engine speeds for a multicylinder four-stroke engine. Mathematical analysis of an improved model of manifold systems, which model includes the engine cylinders as part of the model, reveals a pair of dimensionless parameters which define the performance of the engine using that manifold. The unique discovery of the present invention are minimum values for the two dimensionless parameters which ensure an efficient tuned manifold system. When the values of the two parameters fall below the minimum values, the mathematical model correctly describing the performance of the actual manifold collapses from the two-mode two degree-of-freedom model to a one degree-of-freedom model. The one degree-of-freedom, or single cylinder, model predicts only one torque peak, thereby sacrificing the broad power band provided by the two torque peaks of the two degree-of-freedom model. Further, when the values of the two parameters fall below the minimum values, the system parameters at the single point at which the one degree-of-freedom manifold system resonates will generally not be in the optimum range and performance will suffer.

Calculation of the two values in a manifold system is simple and direct, providing an unburdensome path to choosing the dimensions of a manifold system for a specific engine.

Accordingly, the present invention is directed to a fourstroke internal compustion engine and intake manifold comprising two, three or four primary runners each connected at first ends to an engine cylinder and together at second ends to a secondary runner. A primary volume is defined as the volume of an engine cylinder with its piston at midstroke. A secondary volume is defined as the total volume of all primary runners, other than a primary runner attached to a first cylinder, and all cylinder intake ports, other than the intake port for the first cylinder. The manifold dimensions are limited so that the ratio of the length-to-area ratio of the secondary runner divided by the length-to-area ratio of any primary runner is at least 0.15; and, so that the ratio of the secondary volume divided by the primary volume is at least 2.0.

A plenum volume may be connected between the secondary runner and primary runners, wherein the secondary volume is defined to include the plenum volume. Intermediate runners may also be connected between the secondary runner and primary runners, wherein the secondary volume is defined to include the volume of the secondary runners.

The invention additionally includes a four-stroke internal combustion engine and intake manifold comprising two groups of intake manifolds as described wherein the secondary runners attach to a tertiary runner. A plenum volume or intermediate runners may also be attached between the secondary runner and primary runners of each group.

The invention further includes a four-stoke internal combustion engine and exhaust manifold as described, wherein the primary volume is defined as the volume of an engine cylinder with its piston at bottom dead center.

DESCRIPTION OF THE DRAWINGS

The present invention will be more clearly understood from a reading of the following detailed description in conjunction with the accompanying drawings wherein.

DETAILED DESCRIPTION

Figure 1:
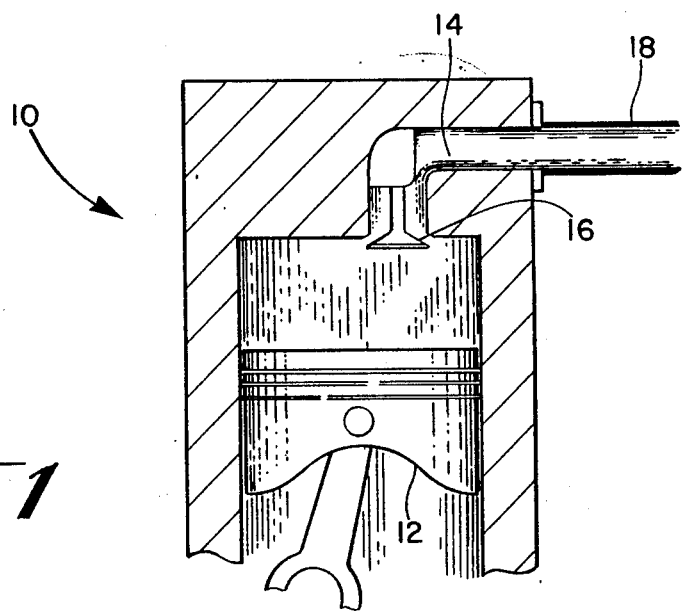
FIG. 1 is a simplified cross-sectional side view of a single engine cylinder showing the relationship of the piston, intake or exhaust port and valve, and runner pipe.

Referring now to FIG. 1 of the drawings, there is shown a simplified cross-sectional view of a single engine cylinder 10 showing the relationship of the piston 12, intake exhaust port 14, valve 16, and runner pipe 18. Runner 18 which leads directly out from the port is a primary runner. While port 14 us either an intake or exhaust port, for convenience of discussion it will generally be referred to as an intake port in the figures and discussion that follow.

Figure 2:
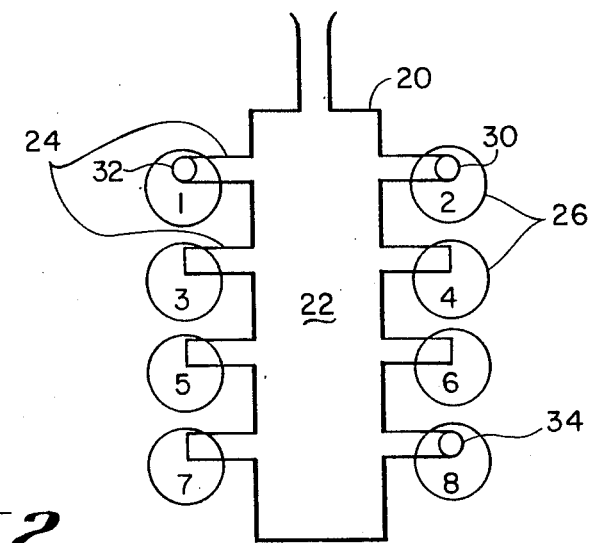
FIG. 2 is a simplified cross-sectional top view of a typical one degree-of-freedom intake manifold for an eight cylinder fourstroke engine comprising a plenum connected by eight separate primary runners to the cylinders.

FIG. 2 is a simplified cross-sectional top view of a typical "single plane" intake manifold 20 for an eight cylinder four-cycle (or four-stroke) engine, comprising a plenum 22 connected by eight separate primary runners 24 to the cylinders 26. The eight cylinders are conventionally numbered 1, 2, 3, 4, 5, 6, 7 and 8 as shown. The cylinders are fired one at a time using a conventional 1-8-4-3-6-5-7-2 firing order. The periods during which the valves are open in a multi-cylinder four-cycle engine of five or more cylinders overlap. In FIG. 2, three intake valves are simultaneously in some stage of being open. Cylinder 2 is completing an intake stroke and its intake valve 30 is closing in preparation for the compression stroke. Cylinder 1 is in the middle of its intake stroke and its intake valve 32 is fully open. Cylinder 8 is just beginning an intake stroke and its intake valve 34 is beginning to open. The intake valves of the other cylinders are all closed as they are in other stages of compression, power or exhaust.

Figure 3:
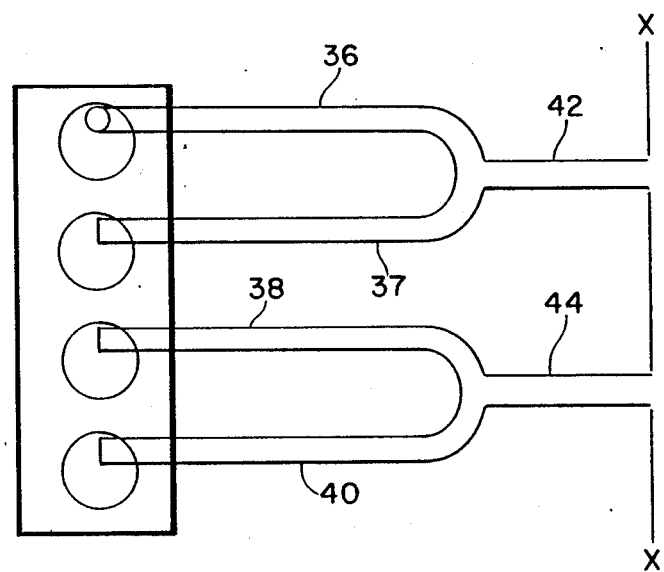
FIG. 3 is a simplified cross-sectional top view of a four cylinder engine, or four cylinder bank of a larger engine, showing a manifold comprising two pairs of primary runners connected to two secondary runners.

The two-mode two degree-of-freedom model discussed in the background and in the referenced papers models a multi-cylinder engine as having only one intake port substantially open at a time. In a manifold with five or more primary runners 24 meeting at plenum 22, a pressure-time history would show, instead of the distinct breathing strokes of the individual cylinders, a pressure level with small amplitute perturbations. This system will produce only one torque peak. To successfully use the model in an engine with more than 4 cylinders, the engine must be broken up into separate subsections, or groups, of two, three or four cylinders. FIG. 3 shows a four cylinder engine, or a four cylinder bank of a larger engine, broken up into a pair of independent two cylinder subsections. Primary runners 36, 37, 38 and 40 connect together to secondary runners 42 and 44. The secondary runners are open to the atmosphere through separate carburetors and air filters, or air intakes in the case of a fuel injected or diesel engine, or even, as will be described, through mechanical add-on superchargers or similar devices. Plane X—X indicates the boundary of the resonator model in this and in later figures.

Figure 4:
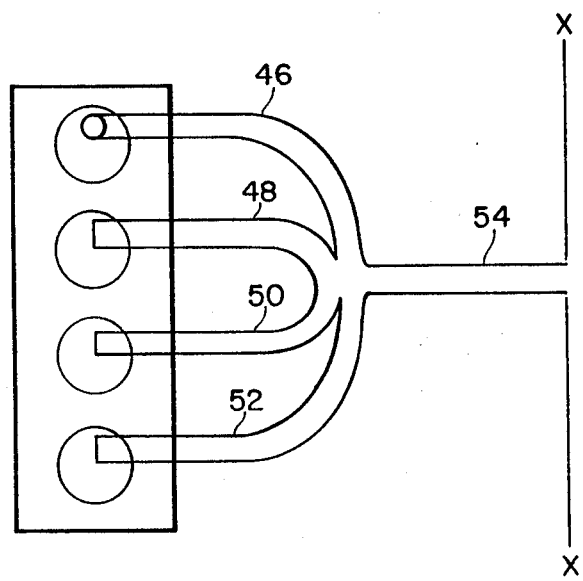
FIG. 4 is a simplified cross-sectional top view of a four cylinder engine, or four cylinder bank, showing a manifold comprising four primary runners connected to one secondary runner.

FIG. 4 shows a four cylinder bank having four primary runners 46, 48, 50 and 52 connected to a single secondary runner 54.

Figure 5:
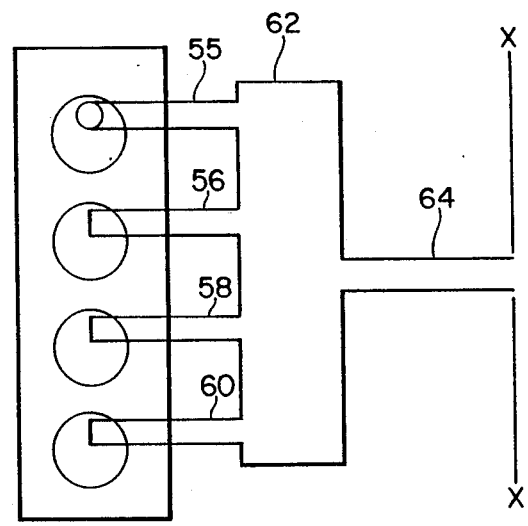
FIG. 5 is a simplified cross-sectional top view of a four cylinder engine, or four cylinder bank, showing a manifold comprising four primary runners connected to a plenum which is in turn connected to a single secondary runner.

FIG. 5 shows a four cylinder bank having four primary runners 55, 56, 58 and 60 connected to plenum 62 which is connected to a single secondary runner 64.

Figure 6:
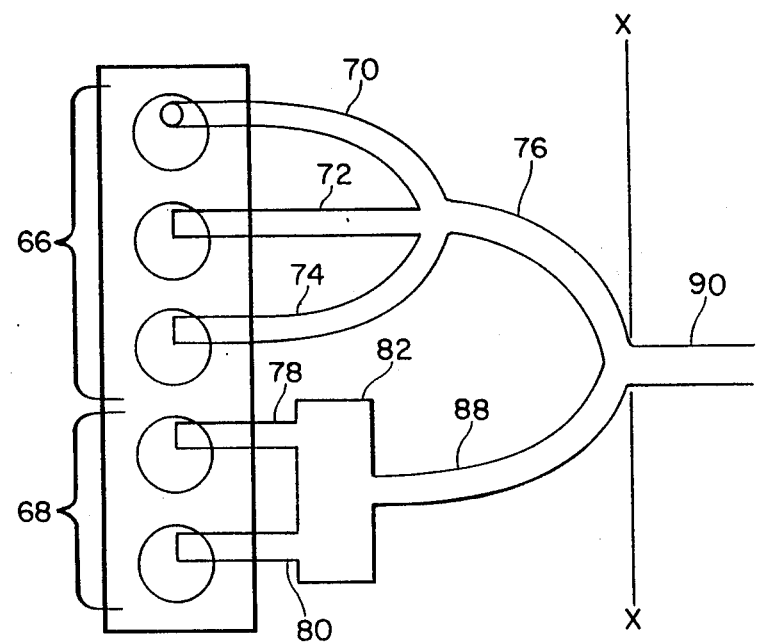
FIG. 6 is a simplified cross-sectional top view of a five cylinder engine showing a manifold comprising three primary runners connected to a first secondary runner, two primary runners connected to a plenum and a second secondary runner from the plenum connected, along with the first secondary runner, to a single tertiary runner.

FIG. 6 shows a five cylinder engine broken up into a three cylinder manifold subsection 66 and a two cylinder manifold subsection 68. Splitting the manifold on engines of five or more cylinders into separate subsections of two, three and four cylinders preserves the validity of the model and provides the advantages of the present invention to such engines. Each subsection must be itself a two degree-of-freedom system for the overall model to remain valid. Each subsection, or group, comprises one secondary runner and two, three or four primary runners. Subsection 66 comprises three primary runners 70, 72 an 74 connected to secondary runner 76. Subsection 68 comprises primary runners 78 and 80 connected to plenum 82. Plenum 82 is connected to secondary runner 88 which connects to secondary runner 76 at tertiary runner 89. In manifold configurations separating engine configurations of five or more cylinders into manifold subsections of four or fewer cylinders, the secondary runners may combine at a tertiary runner which is open or leads to the atmosphere within the definition of the model. As can be seen by the example of FIG. 6, a great variety of combinations of manifold components may be assembled within the confines of the model. The choice of combination may be for physical reasons such as fitting the manifold in the allowable space, or for performance choices as will be described.

The dimensionless parameters used in the invention are calculated from the dimensions of the manifold and of the engine to which the manifold will be attached. As has been described, one of the advantages of the two-mode two degree-of-freedom model is that, unlike other models, it includes the engine with the manifold in modeling the flows within the manifold-engine system. The first dimension is the primary volume which, for an intake manifold, is the volume of a single chosen cylinder with its piston at midstroke. For an exhaust manifold, it is the cylinder volume with the piston at bottom dead center. The second dimension is the secondary volume which is the total volume of all primary runners other than the primary runner connected to the chosen cylinder and all ports other than the port connected to the chosen cylinder. The volume of a port is computed from the average cross-sectional area of the port path along a length from the top of the valve head to the plane of intersection with the manifold, or may be included as part of the primary runner when the manifold is cast in as a part of the head. When a plenum is included in the manifold system between primary runners and a secondary runner, it is added as part of the secondary volume. The third dimension is the length-to-area ratio of the primary runners. The fourth dimension is the length-to-area ratio of the secondary runners. Changes in cross-sectional area of various runners do not cause a problem in the model because the runners may be further broken up into sections of constant cross-sectional area and the length-to-area ratios summed to obtain the effective length-to-area ratio of the entire runner.

The two dimensionless parameters for the resonator model (or resonator model subsection) are: (a) the runner coefficient, the length-to-area ratio of the secondary runner divided by the length-to-area ratio of a primary runner to a single cylinder; and, (b) the volume coefficient, the total secondary volume divided by the primary volume. Those with skill in the art will readily see the analogy of the dimensions and dimensionless parameters with electrical L-C circuit and other mechanical equivalents The volumes are analgous to the potential energy storing devices such as electrical capacitors and to springs, and the length-to-area ratios are analgous to impedances provided by electrical inductors or other mechanical equivalents.

Figure 7:
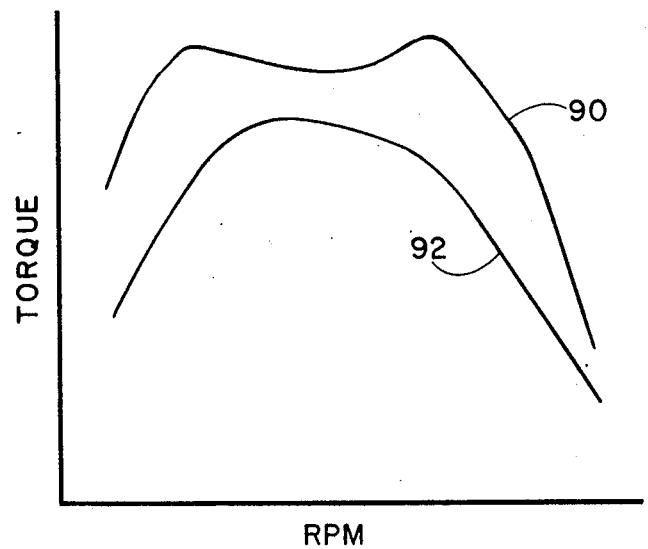
FIG. 7 is a graphical representation of torque versus engine speed for an engine with a manifold system made according to the teachings of the invention and with a manifold system with dimensionless parameters below the minimum values called for by the invention.

Quadratic equations, like the characteristic equation describing the multi-cylindered two-mode two degree-of-freedom model of a manifold system, have two solutions. In a manifold system, the two solutions relate to two torque peaks over the rpm speed range of the engine. The two-mode two degree of system is discovered to remain valid only when the runner coefficient and the volume coefficient are above respective minimum values. If the values are allowed to drop to below those values, the model collapses into a single degree-of-freedom system having a single torque peak, sacrificing the power band broadening effect of the two separate torque peaks. Further, when the values drop below the stated minimum values, the system parameters at the single point at which the manifold system resonates will generally not be in the optimum range and performance will suffer. FIG. 7 graphically shows the typical difference between engine performance in a multi-cylinder engine where the intake manifold is made so that the two degree-of-freedom model remains valid, indicated by torque vs. engine speed curve 90, and where the intake manifold is not so made, indicated by torque vs. engine speed curve 92.

The minimum value of the runner coefficient is 0.15. The minimum value of the volume coefficient is 2.0. A particular advantage of the use of minimum values of these parameters in building manifold systems is the freedom of design they provide. A wide variety of shapes and sizes of manifold components may be selected to satisfy any number of physical and other design constraints while still providing an efficient manifold system. For example, the parameters do not place any restriction on the shape of the runners. The cross-sectional area is important, the shape is not. Oval, square or rectangular runners may be used with equal good effect. The runner length is simply measured along the centerline of flow and the length-to-area ratios of different segments merely added as previously explained.

Figure 8:
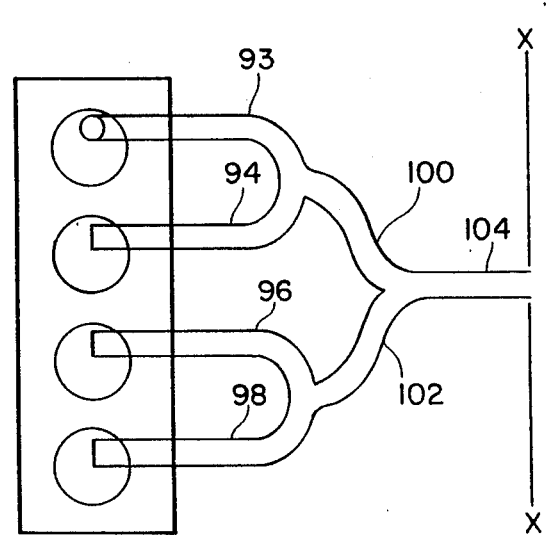
FIG. 8 is a simplified cross-sectional top view of a four cylinder engine with a "tri-y" manifold system.

The invention is particularly adaptable to other modifications to achieve desired results. For example, adding a plenum volume such as plenum 62 at the ends of the primary runners will cause the two torque peaks to move closer together. By reducing the secondary volume in the manifold system, the torque peaks will move further apart. FIG. 8 shows a "tri-y" manifold in a fourstroke engine which sizes the primary runners 93, 94, 96 and 98 at a shorter than normal length and connects them through intermediate runners 100 and 102 to secondary runner 104. Combining the primary runners in this manner reduces their total volume and moves the torque peaks further apart. Those with skill in the art will see that adding intermediate runners 100 and 102 to the manifolds of FIG. 3 converts that manifold into the "tri-y" manifold of FIG. 8, thereby permitting the use of a single carburetor, or other device.

Figure 9:
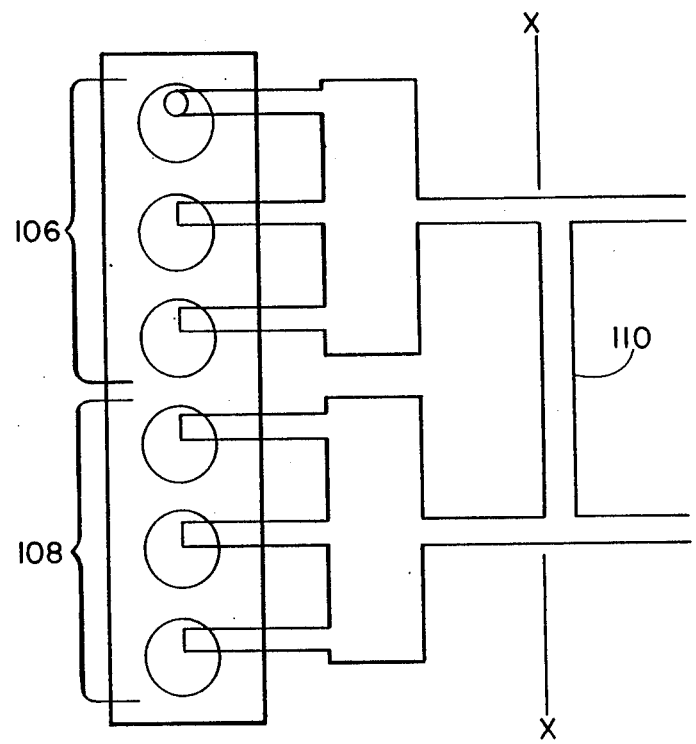
FIG. 9 is a simplified cross-sectional top view of a six cylinder engine showing the use of a cross-over runner between manifolds.

FIG. 9 shows a manifold for a six cylinder engine comprising two independent subsection manifolds 106 and 108. A cross-over runner 110 serves the same function as a tertiary runner, or volume, to end the resonator model at plane X—X to allow, for example, the use of two separate carburetors at a convenient distance from the cylinders while maintaining shorter secondary runner lengths.

Figure 10:
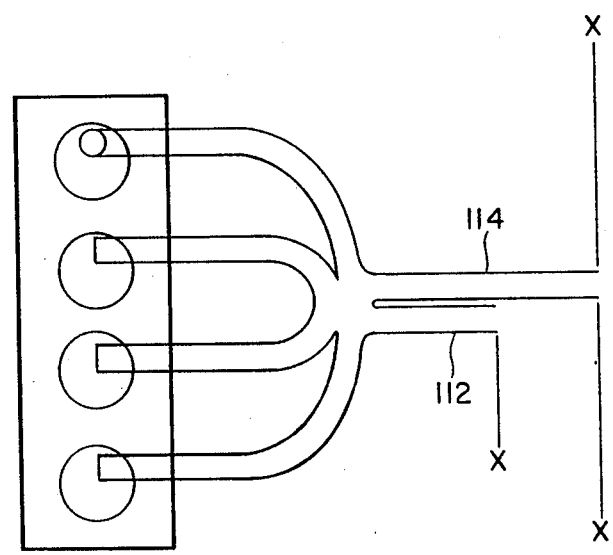
FIG. 10 is a simplified cross-sectional top view of a four cylinder engine showing the use of a single secondary runner comprised of two parallel pipes.

FIG. 10 shows a manifold for a four cylinder engine with a single manifold. The model is not changed by the use of two pipes as the secondary runner as long as the length-to-area ratio·of both pipes is equal. In FIG. 10, pipe 112 is 10 units long with a cross-sectional area of 1 sq.unit. Pipe 114 is 20 units long with a cross-sectional area of 2 sq.units. The total effective cross-sectional area is 3 sq.units and the total effective length-to-area ratio of the secondary runner is 10. This configuration allows the use, for example, of carburetors with different barrel dimensions in a single system. Those with skill in the art will also see that part of a carburetor, depending upon its design, may have to be included as part of the secondary runner and will add a length-to-area ratio to the effective length-to-area ratio of the secondary runner.

Another particular advantage of the two-mode two degree-of-freedom model in intake and exhaust systems is that adding components between the secondary runners and the atmosphere, or between the tertiary runners and the atmosphere in engines of five or more cylinders, does not effect the validity of the model's assumption that the runners are open to the atmosphere. the reasonator model ends at the end of the secondary runner opposite the cylinders and further components, such as carburetors, air filters, superchargers, turbochargers and mufflers, control the flow, but not the resonator model and the resulting torque peaks. A carburetor, air cleaner, muffler or catalytic converter placed within the boundary of the resonator model will contribute to the length-to-area ratio of the runner in which it is located and, if located as part of a primary runner, to the secondary volume. A supercharger component will add its efficiency peak to the intake and exhaust peaks so that the engine can have five different torque peak speeds. By placing the torque speeds in or near the same engine operating range, at either the same speed or at offset speeds, a very powerful torque peak or a very broad torque curve may be achieved.

In a two, three or four cylinder manifold, and within a subsection of a manifold of two or more subsections, care should be taken to see that the lengths of individual primary runners do not differ by more than 20%, and that the length-to-area ratio of all primary runners is substantially equal. Similarly, the lengths of individual secondary runners should not differ by more than 20%, and the length-to-area ratio of all secondary runners should be substantially equal. The two torque peaks of all subsections should be substantially equal. Otherwise, the engine speed will lope. The teachings of the referenced papers, particularly ASME Paper No. 76-WA/DGP-4, may be used to adjust the dimensions to achieve substantially equal torque peaks in all subsections.

A further constraint affecting the validity of the model is that plenum volumes should generally not exceed fifteen times the displacement of a single cylinder. Also, the runners should have lengths greater than 2.5 times the diameter of a circle having the same cross-sectional area of that runner.

Further performance increases may be obtained by recognition that the cross-sectional areas of the runners may be adjusted to achieve pre-selected time averaged flow velocities at the resonator-defined torque peak engine speeds. It has been determined that average flow velocities of 130 ft/sec in the secondary intake runner at the lower engine torque speed; 95 ft/sec in the secondary exhaust runner at the lower engine torque speed of a constant speed engine; 145 ft/sec in the secondary exhaust runner at the lower engine torque speed of a variable speed engine; and, 245 ft/sec in a primary intake or exhaust runner at the upper engine torque speed, will produce an additional increase in performance.

The disclosed manifold for a multi-cylinder engine successfully demostrates the use of both an accurate manifold model and an understanding of the range parameters affecting the validity of the model. Though the disclosed use is specialized, it will find specific application in other areas of mechanical design.

It is understood that certain modifications to the invention as described may be made, as might occur to one with skill in the field of the invention, within the scope of the claims. Therfore, all embodiments contemplated have not been shown in complete detail. Other embodiments may be developed without departing from the spirit of the invention or from the scope of the claims.

I claim:

1. A four-stroke internal combustion engine, comprising;
   (a) a first plurality of no more than four cylinders. including a first cylinder, each cylinder having a piston and an intake port, wherein the volume of a cylinder with its piston at mildstroke is defined as a primary voume:
   (b) a second plurality of no more than four primary runners, each primary runner having a first end, a second end and a preselected length-to-area ratio, connected at each primary runner first end to a respective cylinder at the cylinder at the cylinder intake port, wherein the total volume of all primary runners, other than the primary runner connected to the first cylinder, and all intake ports connected to one of said primary runners, othe than the intake port for the first cylinder, is defined as a secondary volume;
   (c) a secondary runner having a first end, a second end and a preselected length-to-area ratio, connected at its first end to the second ends of the primary runners, the second end of the secondary runner leading to the atmosphere;
   (d) wherein the ratio of the length-to-area ratio of the secondary runner divided by the length-to-area ratio of any primary runner is at least 0.15; and,
   (e) wherein the ratio of the secondary volume divided by the primary volume is at least 2.0.

2. The engine according to claim 1, further comprising a plenum volume connected between the secondary runner and primary runners, wherein the defined secondary volume includes the plenum volume.

3. The engine according to claim 1, further comprising a third plurality of intermediate runners connected between the secondary runner and primary runners, wherein the defined secondary volume includes the volume of the intermediate runners.

4. A four-stroke internal combustion engine, comprising;
   (a) a plurality of cylinders including first and second cylinders, each cylinder having a piston and an intake port, wherein the volume of the first cylinder with its piston at midstroke is defined as a first primary volume and the volume of the second cylinder with its piston at midstroke is defined as a second primary volume, comprising:
   (b) a first group of a plurality of no more than four primary runners, each primary runner having a first end, a second end and a preselected length-to-area ratio, connected at each primary runner first end to a respective cylinder of a corresponding first group of cylinders at each cylinder intake port, wherein the first group of cylinders includes said first cylinder and wherein the total volume of all first group primary runners, other than the primary runner connected to the first cylinder, and all first group intake ports, other than the intake port for the first cylinder, is defined as a first group secondary volume;
   (c) a first group secondary runner having a first end, a second end and a preselected length-to-area ratio, connected at its first end to the second ends of the first group primary runners;
   (d) a second group of a plurality of no more than four primary runners, each primary runner having a first end, a second end and a preselected length-to-area ratio, connected at each primary runner first end to a respective cylinder of a corresponding second group of cylinders at each cylinder intake port, wherein the second group of cylinders includes said second cylinder and wherein the total volume of all second group primary runners, other than the primary runner connected to the second cylinder, and second group intake ports, other than the intake port for the second cylinder, is defined as a second group secondary volume;

(e) a second group secondary runner having a first end, a second end and a preselected length-to-area ratio, connected at its first end to the second ends of the second group primary runners;

(f) at least one tertiary runner, having first and second ends, connected at its first end to the second ends of the first and second group secondary runners, the second end of the tertiary runner leading to the atmosphere;

(g) wherein the ratio of the length-to-area ratio of the first group secondary runner divided by the length-to-area ratio of any first group primary runner is at least 0.15;

(h) wherein the ratio of the first group secondary volume divided by the first primary volume is at least 2.0.

(i) wherein the ratio of the length-to-area ratio of the second group secondary runner divided by the length-to-area ratio of any second group primary runner is at least 0.15; and, (j) wherein the ratio of the second group secondary volume divided by the second primary volume is at least 2.0.

5. The engine according to claim 4, further comprising a plenum volume connected between the first group secondary runner and first group primary runners, wherein the defined first group secondary volume includes the plenum volume.

6. The engine according to claim 5, further comprising a plurality of intermediate runners connected between the first group secondary runner and first group primary runners, wherein the defined first group secondary volume includes the volume of the intermediate runners.

7. A four-stroke internal combustion engine, comprising;
(a) a first plurality of no more than four cylinders, including a first cylinder, each cylinder having a piston and an exhaust port, wherein the volume of a cylinder with its piston at bottom dead center is defined as a primary volume:

(b) a second plurality of no more than four primary runners, each primary runner having a first end, a second end and a preselected length-to-area ratio, connected at each primary runner first end to a respective cylinder at the cylinder exhaust port, wherein the total volume of all primary runners, other than the primary runner connected to the first cylinder, and all exhaust ports connected to one of said primary runners, other than the exhaust port for the first cylinder, is defined as a secondary volume;

(c) a secondary runner having a first end, a second end and a preselected length-to-area ratio, connected at its first end to the second ends of the primary runners, the second end of the secondary runner leading to the atmosphere;

(d) wherein the ratio of the length-to-area ratio of the secondary runner divided by the length-to-area ratio of any primary runners is at least 0.15; and, (e) wherein the ratio of the secondary volume divided by the primary volume is at least 2.0.

8. The engine according to claim 7, further comprising a plenum volume connected between the secondary runner and primary runners, wherein the defined secondary volume includes the plenum volume.

9. The engine according to claim 7, further comprising a third plurality of intermediate runners connected between the secondary runner and primary runners, wherein the defined secondary volume includes the volume of the intermediate runners.

10. A four-stroke internal combustion engine, comprising;
(a) a plurality of cylinders including first and second cylinders, each cylinder having a piston and an exhaust port, wherein the volume of the first cylinder with its piston at bottom dead center is defined as a first primary volume and the volume of the second cylinder with its piston at bottom dead center is defined as a second primary volume, comprising:

(b) a first group of a plurality of no more than four primary runners, each primary runner having a first end, a second end and a preselected length-to-area ratio, connected at each primary runner first end to a respective cylinder of a corresponding first group of cylinders at each cylinder exhaust port, wherein the first group of cylinders includes said first cylinder and wherein the total volume of all first group primary runners, other than the primary runner connected to the first cylinder, and all first group exhaust ports, other than the exhaust port for the first cylinder, is defined as a first group secondary volume;

(c) a first group secondary runner having a first end, a second end and a preselected length-to-area ratio, connected at its first end to the second ends of the first group primary runners;

(d) a second group of a plurality of no more than four primary runners, each primary runner having a first end, a second end and a preselected length-to-area ratio, connected at each primary runner first end to a respective cylinder of a corresponding second group of cylinders at each cylinder exhaust port, wherein, wherein the second group of cylinders includes said second cylinder and wherein the total volume of all second group primary runners, other than the primary runner connected to the second cylinder, and second group exhaust ports, other than the exhaust port for the second cylinder, is defined as a second group secondary volume;

(e) a second group secondary runner having a first end, a second end and a preselected length-to-area ratio, connected at its first end to the second ends of the second group primary runners;

(f) at least one tertiary runner, having first and second ends, connected at its first end to the second ends of the first and second group secondary runners, the second end of the tertiary runner leading to the atmosphere;

(g) wherein the ratio of the length-to-area ratio of the first group secondary runner divided by the length-to-area ratio of any first group primary runner is at least 0.15;

(h) wherein the ratio of the first group secondary volume divided by the first primary volume is at least 2.0.

(i) wherein the ratio of the length-to-area ratio of the second group secondary runner divided by the length-to-area ratio of any second group primary runner is at least 0.15; and, (j) wherein the ratio of the second group secondary volume divided by the second primary volume is at least 2.0.

11. The engine according to claim 10, further comprising a plenum volume connected between the first group secondary runner and first group primary runners, wherein the defined first group secondary volume includes the plenum volume.

12. The engine according to claim 10, further comprising a plurality of intermediate runners connected between the first group secondary runner and first group primary runners, wherein the defined first group secondary volume includes the volume of the intermediate runners.

* * * * *